United States Patent
Roberts et al.

(10) Patent No.: US 7,621,655 B2
(45) Date of Patent: Nov. 24, 2009

(54) LED LIGHTING UNITS AND ASSEMBLIES WITH EDGE CONNECTORS

(75) Inventors: John K. Roberts, Grand Rapids, MI (US); Paul E. Sims, Pittsboro, NC (US)

(73) Assignee: Cree, Inc., Durham, NC (US)

( * ) Notice: Subject to any disclaimer, the term of this patent is extended or adjusted under 35 U.S.C. 154(b) by 173 days.

(21) Appl. No.: 11/600,642

(22) Filed: Nov. 16, 2006

(65) Prior Publication Data

US 2007/0115682 A1     May 24, 2007

Related U.S. Application Data

(60) Provisional application No. 60/738,305, filed on Nov. 18, 2005.

(51) Int. Cl.
*F21S 4/00* (2006.01)
*F21V 21/00* (2006.01)

(52) U.S. Cl. ............. 362/249.02; 362/240; 362/249.06; 362/800

(58) Field of Classification Search ........................ None
See application file for complete search history.

(56) References Cited

U.S. PATENT DOCUMENTS

| | | | |
|---|---|---|---|
| 3,693,134 A | | 9/1972 | Trevisiol |
| 6,007,209 A | * | 12/1999 | Pelka ........................... 362/30 |
| 2002/0141181 A1 | * | 10/2002 | Bailey ......................... 362/150 |
| 2003/0058191 A1 | | 3/2003 | Yuhara et al. |
| 2006/0007553 A1 | | 1/2006 | Bogner et al. |
| 2006/0262533 A1 | * | 11/2006 | Lin et al. ...................... 362/249 |

FOREIGN PATENT DOCUMENTS

| | | |
|---|---|---|
| DE | 100 51 528 A1 | 5/2002 |
| FR | 1 498 649 | 9/1966 |
| WO | WO 2004/032235 A2 | 4/2004 |

OTHER PUBLICATIONS

International Search Report and Written Opinion for PCT/US2006/044565; date of mailing Apr. 25, 2007.
U.S. Appl. No. 11/408,648, filed Apr. 21, 2006.

* cited by examiner

*Primary Examiner*—Bao Q Truong
*Assistant Examiner*—Danielle Allen
(74) *Attorney, Agent, or Firm*—Myers Bigel Sibley & Sajovec, P.A.

(57) ABSTRACT

An LED light unit includes a tile, a plurality of discrete LED light sources, and an edge connector. The LED light sources are on and dispersed across a major surface of the tile and are electrically connected to electrical pads along an edge region of the tile. The edge connector includes a plurality of contracts that are connected to a plurality of wires extending away from the edge connector, and is configured to releasably connect to an edge of the tile so that the contacts directly connect to the pads and electrically connect the wires of the edge connector to the LED light sources. An LED lighting assembly includes a plurality of the discrete tiles mounted to a plurality of bars, and a plurality of edge connectors that are each connected to an end one of the tiles along different ones of the bars.

27 Claims, 8 Drawing Sheets

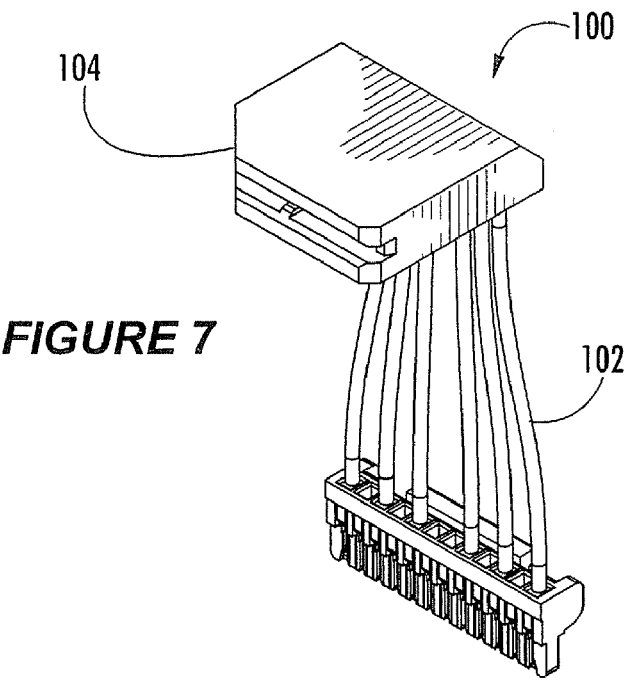
FIGURE 7
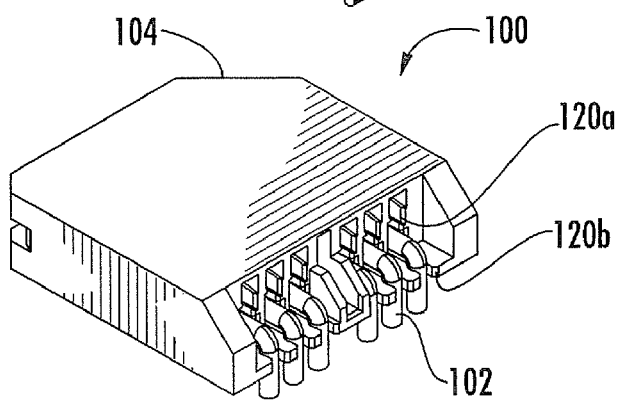
FIGURE 8
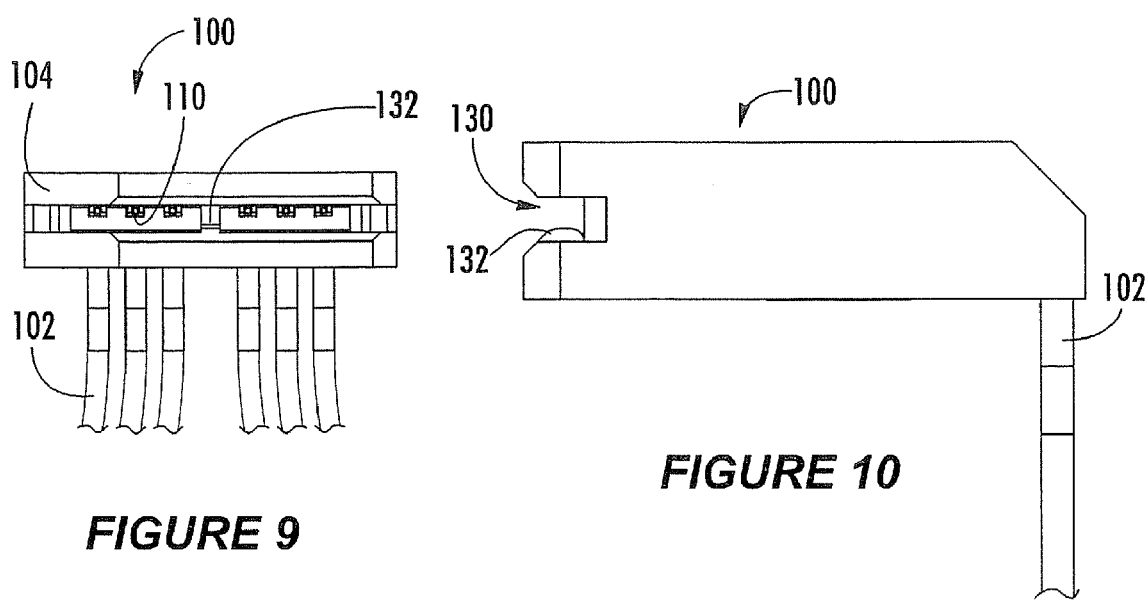
FIGURE 9
FIGURE 10

LED LIGHTING UNITS AND ASSEMBLIES WITH EDGE CONNECTORS

CROSS-REFERENCE TO RELATED APPLICATION

This application claims priority to U.S. Provisional Patent Application No. 60/738,305, filed on Nov. 18, 2005, the disclosure of which is hereby incorporated herein by reference in its entirety.

FIELD OF THE INVENTION

The present invention relates to solid state lighting, and more particularly to relates to apparatus for providing electrical connection to LED lights sources on an LED lighting assembly.

BACKGROUND

Solid state lighting assemblies that include arrays of solid state lights are used for many lighting applications. For example, solid state lighting assemblies have been used as direct illumination sources, for example, in architectural and/or accent lighting. A solid state lighting assembly may include, for example, a two dimensional array of discrete light sources arranged on one or more backplanes to form light panels. Each of the light sources may include one or more light emitting diodes (LEDs). Two types of LEDs that may be used in the light sources include inorganic LEDs, which typically include semiconductor layers that form p-n junctions, and organic LEDs (OLEDs), which include organic light emission layers. LEDs typically generate light through the recombination of electronic carriers, i.e. electrons and holes, in a light emitting region or layer.

Solid state lighting panels are commonly used as backlights for small liquid crystal display (LCD) display screens, such as LCD display screens used in portable electronic devices. In addition, there has been increased interest in the use of solid state lighting panels as backlights for larger displays, such as LCD television displays.

For smaller LCD screens, backlight assemblies typically employ white LED light sources that include a blue light emitting LED coated with a wavelength conversion phosphor that converts some of the blue light into yellow light. The resulting light, which is a combination of blue light and yellow light, can appear white to an observer.

For large-scale backlight and illumination applications, it is often desirable to provide a light source that generates a white light having a high color rendering index, so that objects and/or display screens illuminated by the lighting panel may appear more natural. Accordingly, such light sources typically include an array of LED light source sources, each of which may include red, green and blue LED chips. When red, green and blue LED chips are energized simultaneously, the resulting combined light may appear white, or nearly white, depending on the relative intensities of the red, green and blue light emitted by the LED chips.

With a continuing trend toward providing solid state light panels having higher density and/or larger arrays of LED light sources, there is a continuing need to provide electrical connectivity to the arrays of LED light sources in a manner that allows improvements in the cost, compactness, and/or reliability of the lighting panels and resulting assemblies.

SUMMARY

In some embodiments of the present invention, an LED light unit includes a tile, a plurality of discrete LED light sources, and an edge connector. The LED light sources are on and dispersed across a major surface of the tile and are electrically connected to electrical pads along an edge region of the tile. The edge connector includes a plurality of contacts that are connected to a plurality of wires extending away from the edge connector, and is configured to releasably connect to an edge of the tile so that the contacts directly connect to the pads and electrically connect the wires of the edge connector to the LED light sources.

In some further embodiments, the edge connector may include a body with a plurality of recessed channels defined therein. Each of the recessed channels is configured to guide a portion of one of the edge connector wires at a non-zero angle (e.g., about a 90° angle) away from the major surface of the tile.

The LED light sources may include at least one LED chip within an encapsulant. The LED light unit may include a reflector panel having apertures aligned with the LED light sources. The edge connector may have a low profile, such that its height above the major surface of the tile is no more than a height of the encapsulant and/or no more than a height of an outer surface of the reflector panel above the tile.

The edge connector may include a locking mechanism that is configured to releasably lock onto an opening in the major surface of the tile. The locking mechanism may include a bump that is defined with a cavity in the edge connector and/or a flexure member that extends into the cavity, and which engages the opening in the tile when the connector contacts are directly connected to the tile pads.

Some other embodiments of the present invention are directed to an LED lighting assembly that includes a plurality of the discrete tiles mounted to a plurality of bars, and a plurality of edge connectors that are respectively connected to end tiles along different ones of the bars.

Some embodiments of the invention provide a solid state lighting assembly including a substrate including a major surface, an edge adjacent the major surface, and a plurality of electrical traces on the major surface. A plurality of electrical contact pads are on the major surface of the substrate and are disposed adjacent the edge of the substrate. Each of the plurality of electrical contact pads are connected to a respective one of the plurality of electrical traces. A plurality of solid state light emitting devices are on the major surface of the substrate and are in electrical communication with at least one of the plurality of contact pads through at least one of the plurality of electrical traces. The assembly further includes an edge connector on the edge of the substrate and including at least two electrical contacts in contact with at least two of the electrical contact pads.

BRIEF DESCRIPTION OF THE DRAWINGS

The accompanying drawings, which are included to provide a further understanding of the invention and are incorporated in and constitute a part of this application, illustrate certain embodiment(s) of the invention. In the drawings:

FIG. 7 is a front perspective view of the edge connector of FIG. 4 in accordance with some embodiments of the present invention;

FIG. 8 is a rear perspective view of the edge connector of FIG. 4 in accordance with some embodiments of the present invention;

FIG. 9 is a front view of the edge connector of FIG. 4 in accordance with some embodiments of the present invention;

FIG. 10 is a side view of the edge connector of FIG. 4 in accordance with some embodiments of the present invention;

DETAILED DESCRIPTION OF EMBODIMENTS OF THE INVENTION

Figure 1:
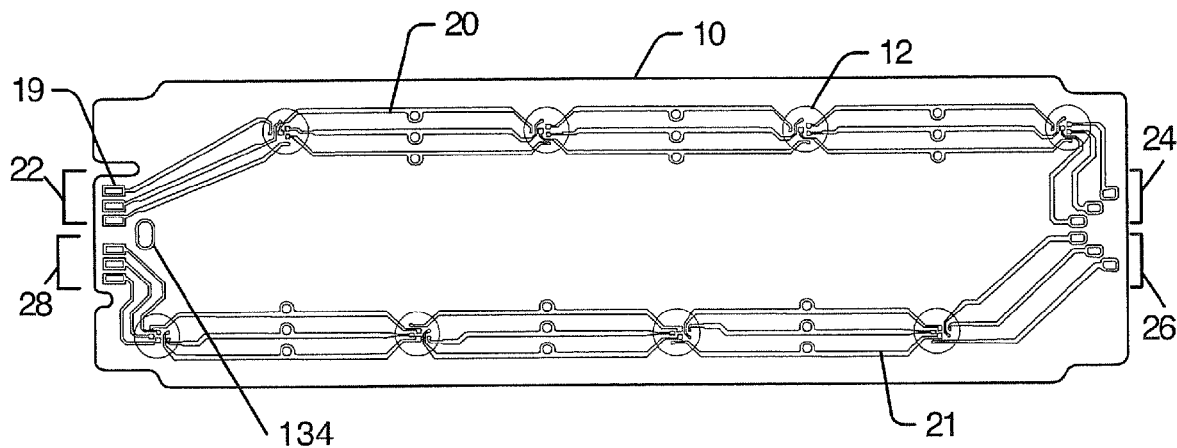
FIG. 1 is a front view of a solid state lighting tile in accordance with some embodiments of the invention.

Embodiments of the present invention now will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or", abbreviated "/", includes any and all combinations of one or more of the associated listed items.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

It will be understood that when an element such as a layer, region or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer or region to another element, layer or region as illustrated in the figures. It will be understood that these terms are intended to encompass different orientations of the device in addition to the orientation depicted in the figures.

Referring now to FIG. 1, a solid state lighting tile 10 includes a plurality of discrete LED light sources 12 that are dispersed across a major surface of the tile 10, and may be arranged in a regular and/or irregular two dimensional array. The tile 10 may include, for example, a printed circuit board (PCB) on which one or more circuit elements may be mounted. In particular, a tile 10 may include a metal core PCB (MCPCB) including a metal core having thereon a polymer coating on which patterned metal traces (not shown) may be formed. MCPCB material, and material similar thereto, is commercially available from, for example, The Bergquist Company. The PCB may further include heavy clad (4 oz. copper or more) and/or conventional FR-4 PCB material with thermal vias. MCPCB material may provide improved thermal performance compared to conventional PCB material. However, MCPCB material may also be heavier than conventional PCB material, which may not include a metal core.

In the embodiments illustrated in FIG. 1, the LED light sources 12 may each include multi-chip clusters of three LED chips per cluster. On the tile 10, four of the light sources 12 are serially connected in a first path 20, while another four of the light sources 12 are serially connected in a second path 21. The tile 10 includes a plurality of contact pads 19 which may be located at ends of each of the first and second paths 20, 21. The light sources 12 of the first path 20 are connected, for example via printed circuits, to a set of three anode pads 22 arranged along a first edge region of the tile 10, and a set of three cathode contacts 24 arranged along an opposite second edge region of the tile 10. The light sources 12 of the second path 21 are connected to a set of three anode pads 26 arranged along the second edge region of the tile 10, and a set of three cathode pads 28 arranged along the first edge region of the tile 10.

Figure 2:
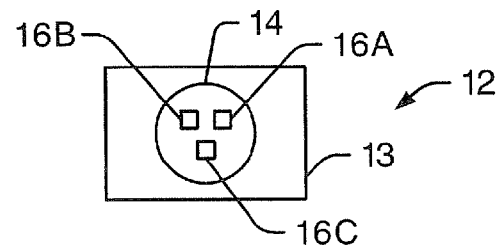
FIG. 2 is a top view of a packaged solid state lighting device including a plurality of LED chips in accordance with some embodiments of the invention.

The LED chips within the light sources 12 may include, for example, organic and/or inorganic LEDs. An exemplary one of the light sources 12 is illustrated in FIG. 2. The light sources 12 of FIG. 2 may each include a carrier substrate 13 on which a plurality of LED chips 16A-16C are mounted. In other embodiments, one or more of the light sources 12 may comprise LED chips 16A-16C mounted directly onto electrical traces on the surface of the tile 10, forming a multi-chip module or chip on board assembly. Suitable tiles are disclosed in commonly assigned U.S. Provisional Patent Application Ser. No. 60/749,133 entitled "SOLID STATE BACKLIGHTING UNIT ASSEMBLY AND METHODS" filed Dec. 9, 2005.

The LED chips 16A-16C may include at least a red LED chip 16A, a green LED chip 16B, and a blue LED chip 16C. The blue and/or green LEDs may be InGaN-based blue and/or green LED chips available from Cree, Inc., the assignee of the present invention. The red LEDs may be, for example, AlInGaP LED chips available from Epistar, Osram and others.

In some embodiments, the LED chips 16 may have a square or rectangular periphery with an edge length of about 900 µm or greater (i.e. so-called "power chips"). However, in other embodiments, the LED chips 16 may have an edge length of 500 µm or less (i.e. so-called "small chips"). In particular, small LED chips may operate with better electrical conversion efficiency than power chips. For example, green LED chips with a maximum edge dimension less than 500 microns and as small as 260 microns, commonly have a higher electrical conversion efficiency than 900 micron chips, and are known to typically produce 55 lumens of luminous flux per Watt of dissipated electrical power and as much as 90 lumens of luminous flux per Watt of dissipated electrical power.

As further illustrated in FIG. 2, the LED chips 16A-16C may be covered by an encapsulant 14, which may be clear and/or may include light scattering particles, phosphors, and/or other elements to achieve a desired emission pattern, color and/or intensity. While not illustrated in FIG. 2, the light source 12 may further include a reflector cup surrounding the LED chips 16A-16C, a lens mounted above the LED chips 16A-16C, one or more heat sinks for removing heat from the lighting device, an electrostatic discharge protection chip, and/or other elements.

Figure 3:
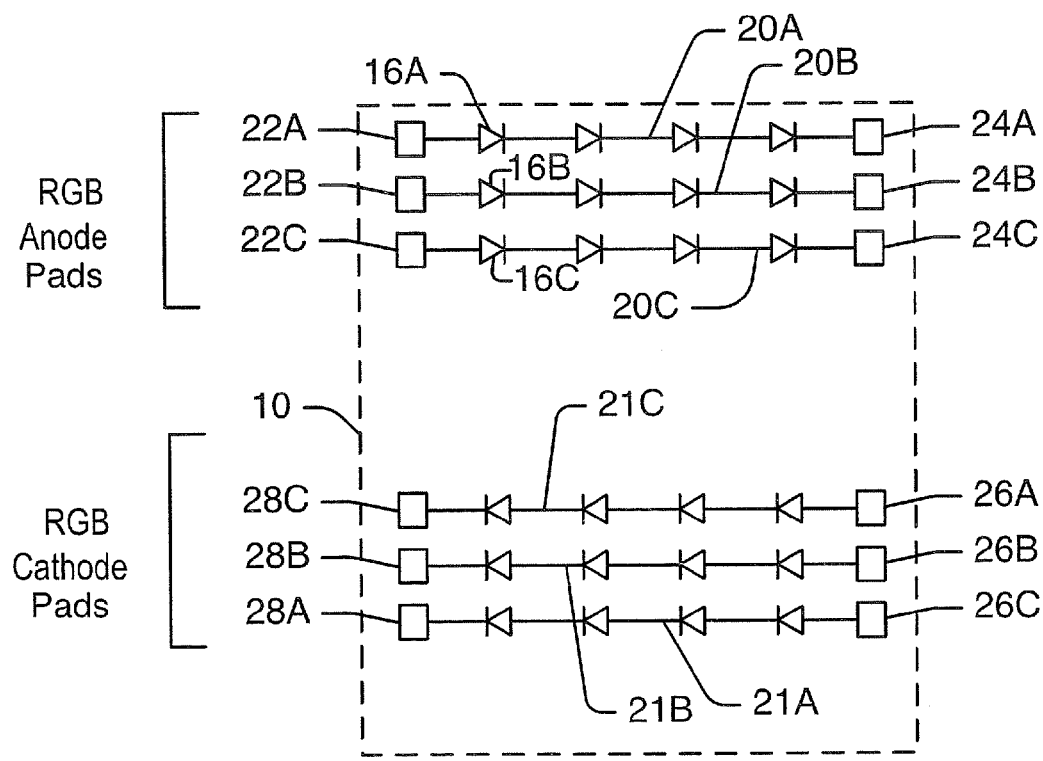
FIG. 3 is a schematic circuit diagram illustrating the electrical interconnection of LED chips in a solid state lighting tile in accordance with some embodiments of the invention.

LED chips 16A-16C of the light sources 12 may be electrically interconnected on the tile 10 as shown in the schematic circuit diagram in FIG. 3. As shown, the LED chips 16A-16C may be interconnected such that the red LED chips 16A in the first path 20 are connected in series to form a string 20A. Likewise, the green LED chips 16B in the first path 20 may be arranged in series to form a string 20B. The blue LED chips 16C may be arranged in series to form a string 20C. Each string 20A-20C may be connected on one end to a corresponding one of the anode pads 22A-22C along a first end region of the tile 10 and on the other end to a corresponding one of the cathode pads 24A-24C along the second end region the tile 10.

One or more of the strings 20A-20C may include all, or less than all, of the corresponding LED chips illustrated in the first or second paths 20, 21. For example, the string 20A may include all of the red LED chips 16A from all of the light sources 12 in the first path 20. Alternatively, a string 20A may include only a subset of the corresponding LED chips in the first path 20. Accordingly the first path 20 may include three serial strings 20A-20C that extend generally parallel across the tile 10.

The second path 21 on the tile 10 may include three strings 21A, 21B, 21C arranged in parallel. The strings 21A-21C are connected to anode contacts 26A-26C along the second end region of the tile 10 and to cathode contacts 28A-28C along the first end region of the tile 10, respectively.

It will be appreciated that, while the embodiments illustrated in FIGS. 1-3 include three LED chips 16A-C per light source 12, and which are electrically connected to form at least three LED strings per path 20, 21, more and/or fewer than three LED chips 16A-C may be included in each lighting source 12, and more and/or fewer than three LED strings may be provided per path 20, 21. For example, the light sources 12 may each include the three LED chips 16A-B and another green LED chip connected to form four strings per path 20, 21. Similarly, in some embodiments, two green LED chips in each light source 12 may be serially connected to one another to form a single string of green LED chips per path 20, 22. Alternatively, a tile 10 may include only a single path 20 instead of plural paths 20, 21 and/or more than two paths 20, 21 may be provided on a single tile 10.

Some embodiments of the present invention are directed to providing an edge connector that may provide a compact, reliable, and/or low cost electrical interconnect between an external electrical device and the anode pads 22 and cathode pads 28 along the first edge region of the tile 10.

Figure 4:
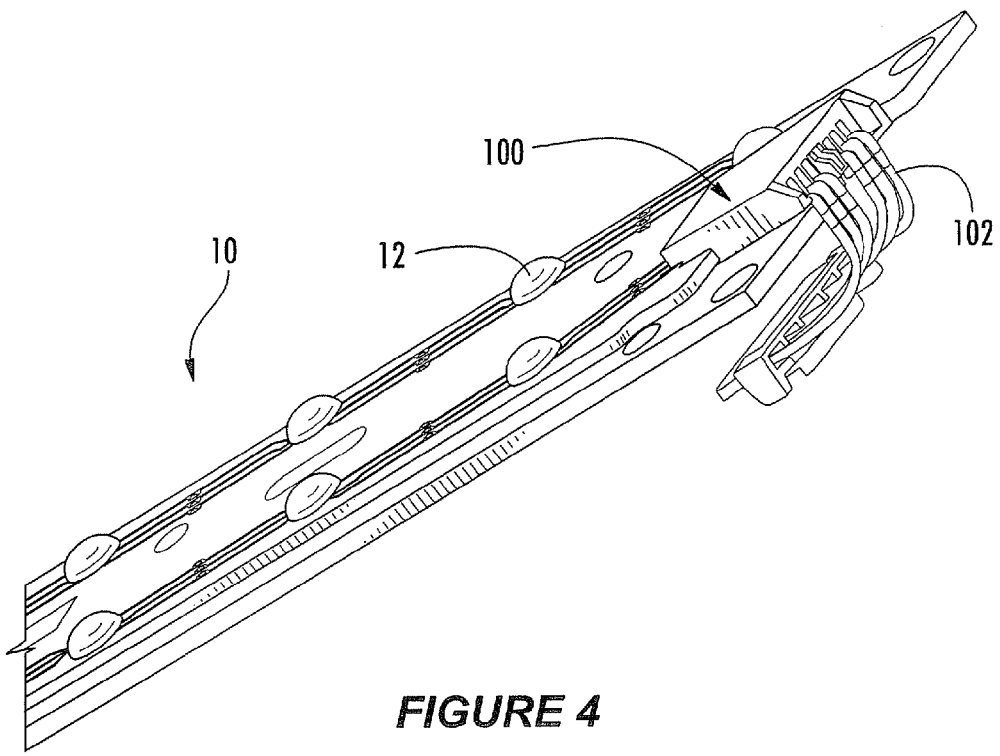
FIG. 4 is a perspective view of an edge connector connected to the tile of FIG. 1 in accordance with some embodiments of the present invention.
Figure 5:
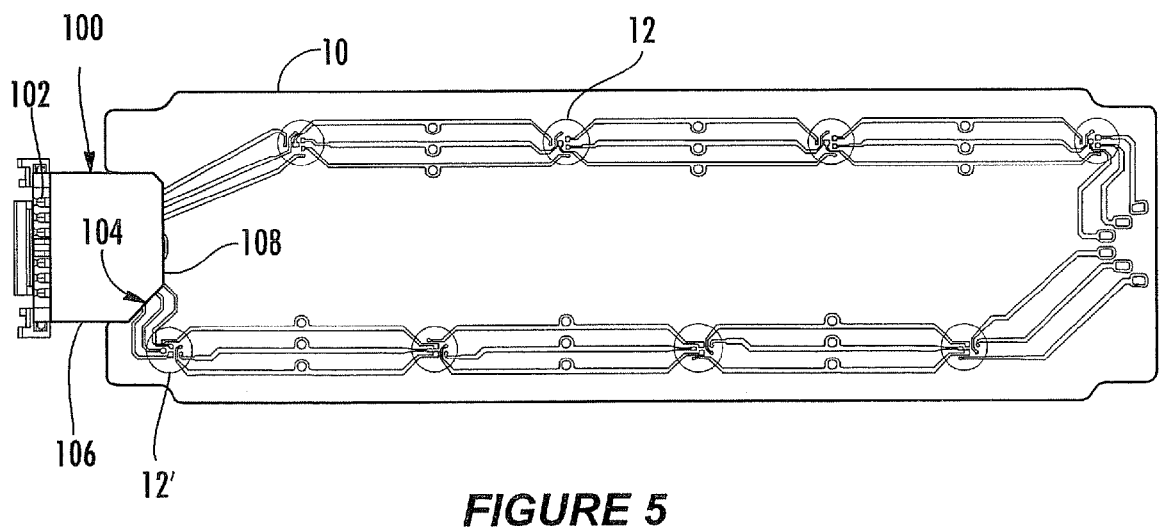
FIG. 5 is a top view of the edge connector and tile of FIG. 4 in accordance with some embodiments of the present invention.
Figure 6:
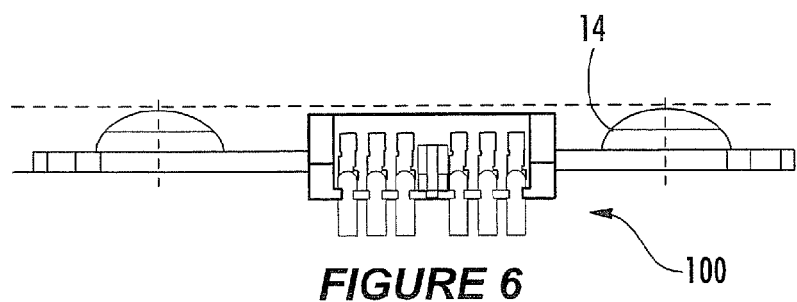
FIG. 6 is a rear view of the edge connector and tile of FIG. 4 in accordance with some embodiments of the present invention.

FIGS. 4, 5, and 6 are a perspective view, a top view, and a rear view, respectively, of an edge connector 100 that is configured in accordance with some embodiments of the present invention and is connected to an edge of the tile 10. FIGS. 7, 8, 9, and 10 are a front perspective view, a rear perspective view, a front view, and a side view of the connector 100 according to some embodiments of the present invention.

The edge connector 100 includes a plurality of contacts 110 (FIG. 9) that are electrically connected to a plurality of wires 102 extending away from the edge connector 100. The edge connector 100 may be configured to releasably connect to an edge of the tile 10 so that the contacts 110 directly connect to different ones of the anode pads 22 and the cathode pads 28 on the tile 10.

Accordingly, the edge connector 100 may connect one group of the wires 102 to the anode pads 22, and connect another group of the wires 102 to the cathode pads 28 along the first edge region of the tile 10. With additional reference to FIG. 3, the edge connector 100 may connect a first pair of the wires 102 to anode pad 22A and cathode pad 28A to form a circuit path through the red LED strings 20A and 21A, connect a second pair of the wires 102 to anode pad 22B and cathode pad 28B to form a circuit path through the green LED strings 20B and 21B, and connect a third pair of the wires 102 to anode pad 22C and cathode pad 28C to form a circuit path through the blue LED strings 20C and 21C. Accordingly, when a sufficient forward bias voltage potential is applied across the various pairs of wires and, thereby, across associated pairs of the anode and cathode pads 22 and 28, current flows through one or more of the LED strings. 20A-C and causes the associated LED chips to emit light.

The wires 102 extending from the edge connector 100 may be separate from one another along a major portion of their length and independently flexible relative to one another, such as shown in FIGS. 4 and 7. Alternatively, the edge connector 100 may connect the contacts 110 to wires in another type of conductive cable, such as ribbon cable and/or flexible membrane.

Referring to FIG. 5, the light sources 12 may be arranged in a staggered grid on the tile 10, and which may result in one of the light sources 12' being closest to the edge connector 100 among the light sources 12. The edge connector 100 may have a notched corner 104 adjacent to the closest light source 12' to increase separation between the connector 100 and the closest light source 12'. For example, as shown in FIG. 5, the edge connector 100 may have an edge surface that extends at about a 45° angle between a side surface 106 and front surface 108 of the edge connector 100.

Notching the corner 104 of the edge connector 100 may reduce or avoid interference by the edge connector 100 to light emitted by the light source 12'. Reducing or avoiding such light interference may be important to avoid undesirable shadows that may otherwise result if a sufficient amount of light that is emitted by light source 12' strikes the edge connector 100. Moreover, when the light source 12' includes a plurality of different color LED chips, the edge connector 100 may be closer to one color LED than to another color LED(s), and which could cause an unequal shadowing of different colors from the light source 12' (i.e., a color fringe effect) if the corner 104 of the connector 100 were not notched to provide sufficient separation from the light source 12'.

The edge connector 100 may be formed from a material, and/or it may be at least partially covered with a material, having a high diffuse light reflectivity (e.g., a bright white material) to reduce or avoid interference by the edge connector 100 to light emitted by one or more of the light sources 12.

Although the exemplary edge connector 100 has been illustrated as having a single notched corner 104, it is to be understood that another corner and/or other portions of the connector 100 may be notched and/or otherwise recessed to increase separation from one or more light sources on the tile 10.

A body of the edge connector 100 includes a plurality of recessed channels 120 that may each be configured to guide a portion of one of the wires 102 away from the tile 10. Referring to FIG. 8, first channel portions 120*a* may extend so as to hold the wires in a plane that is parallel to a plane of a major surface of the tile 10. Second channel portions 120*b* may be configured to releasably connect to a portion of the wire 102, such as via an interference fit relative therebetween, and to guide the connected portion of the wire at a non-zero angle, such as at about a 90° angle, away from the plane of the major surface of the tile 10. Because the wires 102 may be guided at a non-zero angle (e.g., at about a 90° angle) away from the major surface of the tile 10, the wires 102 may not affect placement of the tile 10 immediately adjacent to another tile, component, and/or packaging.

Referring to FIG. 6, a height of the edge connector 100 above the tile 10 may be the same as or less than a height of the encapsulant 14 of the light sources 12. Accordingly, the edge connector 100 may be sufficiently thin so that the maximum height of an assembly of tile 10 connected to the connector 100 may be set by the highest components of the tile 10 and, in particular, height of the encapsulant 14, and not by the height of the edge connector 100. Accordingly, the edge connector 100 may have a sufficiently thin profile to not affect the thickness of an array of the tiles 10 in a lighting assembly.

Some embodiments of the present invention are directed to various locking mechanisms that may be utilized to releasably connect the edge connector 100 to the tile 10. For example, referring to FIG. 10, a body of the edge connector 100 may include a cavity 130 with an inner surface with a bump 132 that extends into the cavity 130. The bump 132 may be located within the cavity 130 so that it engages an opening 134 (FIG. 1) that is defined in the major surface of the tile 10 while the contacts 110 of the edge connector 100 are directly contacting the anode pads 22 and cathode pads 28. Accordingly, as the edge connector 100 is slid onto the first edge of the tile 10 and the contacts 110 become aligned with defined ones of the anode and cathode pads 22 and 28, the bump 132 may at least partially engage the opening 134 in the tile 10 to lock the edge connector. 100 onto the tile 10.

Referring to FIG. 9, the bump 132 may be located along a center portion of the edge connector 100 to separate the wires 102 and associated contacts 110 into two groups, such as two equal groups. For example, the bump 132 may be located between a first group of the wires 102 and associated contacts 110 that connect to the anode pads 22 and a second group of the wires 102 and associated contacts 110 that connect to the cathode pads 28. Placing the bump 132 between the first and second groups of wires 102 and associated contacts 110 can provide greater spacing and thereby insulation between the opposite polarity voltages applied the first group of anode pads 22 and the second group of cathode pads 28. Such increased separation between the anode pads 22 and the cathode pads 28 may help to prevent the formation of unintended current paths (e.g., shorts or partial shorts) between the anode and cathode pads 22 and 28, which might otherwise occur due to humidity, ionic salt exposures, moisture, solvent accumulations, the accumulation of biological matter onto the surface between pads 22 and 28, and the like.

Figure 11:
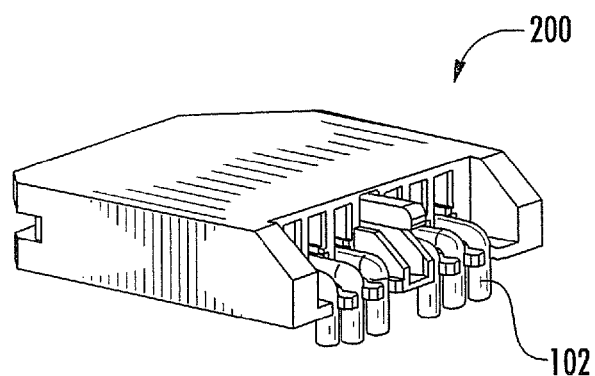
FIG. 11 is a rear perspective view of an edge connector in accordance with some other embodiments of the present invention.
Figure 12:
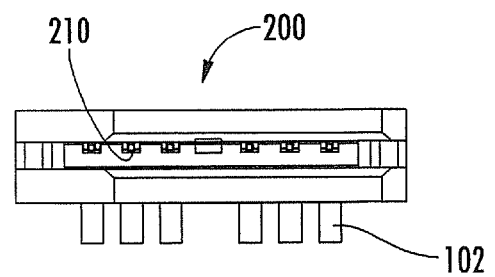
FIG. 12 is a front view of the edge connector of FIG. 11 in accordance with some embodiments of the present invention.
Figure 13:
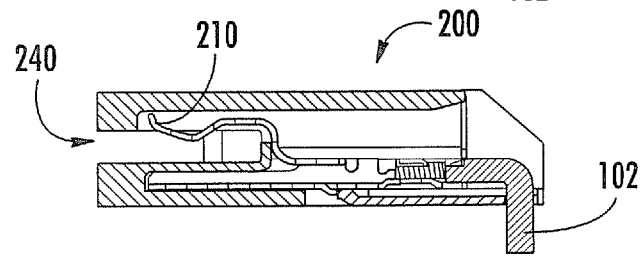
FIG. 13 is a cross-section view along section A-A of the edge connector of FIG. 12 in accordance with some embodiments of the present invention.

Some other embodiments of a locking mechanism that may be used to releasably connect the edge connector 100 to the tile 10 are shown in FIGS. 11, 12, 13, 14, and 15, which are a rear perspective view of another embodiment of a edge connector 200, a front view of the edge connector 200, a cross-section view along section A-A of the edge connector 200 of FIG. 12, a cross-section view along section B-B of the edge connector 200 of FIG. 12, and a cross-section view along section C-C of the edge connector 200 of FIG. 12.

Figure 14:
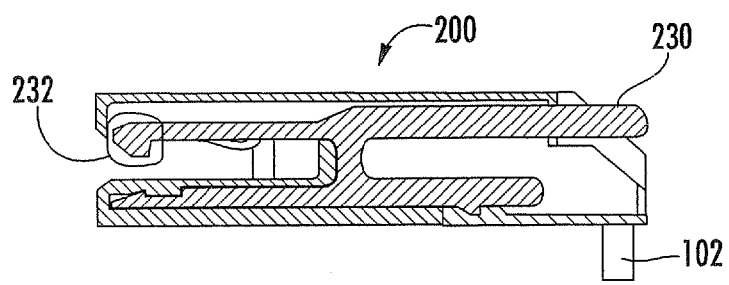
FIG. 14 is a cross-section view along section B-B of the edge connector of FIG. 12 in accordance with some embodiments of the present invention.
Figure 15:
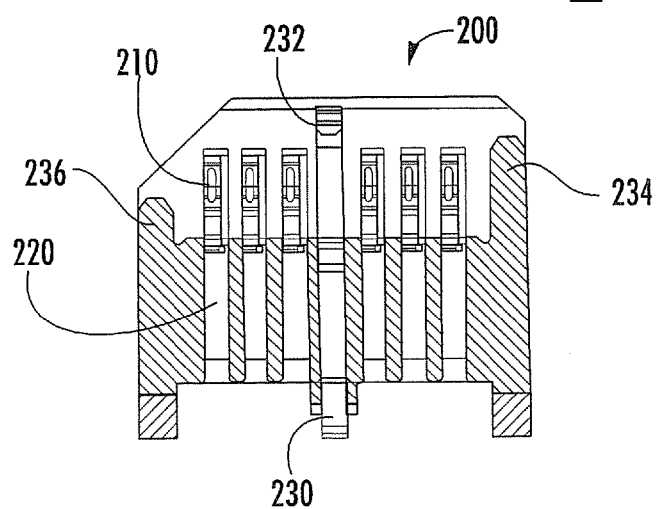
FIG. 15 is a cross-section view along section C-C of the edge connector of FIG. 12 in accordance with some embodiments of the present invention.

Referring to FIGS. 11-15, the edge connector 200 is similar to the edge connector 100 of FIGS. 4-10 in that the edge connector 200 includes a plurality of contacts 210 (FIGS. 12,13,15) that are electrically connected to wires 102 which extend away from the edge connector 200. The contacts 210 are located so as to directly connect to different ones of the anode and cathode pads 22 and 28 on the tile 10 when the edge connector 200 is connected to the tile 10. Referring to FIG. 15, the edge connector 200 body may include a plurality of recessed channels 220 that are each configured to guide a portion of one of the wires 102 away from the tile 10, and may guide the connected portion of the wire at a non-zero angle, such as at about a 90° angle, away from the plane of the major surface of the tile 10.

The edge connector 200 can include a first elongated body member 234 and a second elongated body member 236. The first elongated body member 234 extends further towards the front of the connector then the second elongated body member 236. The first and second elongated body members 234 and 236 are configured to align with, and slide into, the differing length edge notches in the tile 10, illustrated in FIG. 1 along the left edge of the tile 10 adjacent to opposite sides of the contacts 19. The first and second elongated body members 234 and 236 can thereby function to align the edge connector 200 with the contacts 19, and can further function to allow connection of the edge connector 200 with the top surface of the edge connector 200 facing the same direction as the top surface of the tile 10 and prevent connection of the edge connector 200 when the bottom surface thereof is facing the same direction as the top surface of the tile 10.

In contrast to the edge connector 100 of FIGS. 4-10, the edge connector 200, has a locking mechanism that includes a flexure lever 230 which extends through at least a portion of the edge connector 200 body and into a cavity 240 defined in the edge connector 200 body. A cross-section of the flexure lever 230 is shown in FIG. 14. Referring to FIG. 14, the flexure lever 230 may include an enlarged end 232 that is located at a position within the cavity 240 so that the enlarged end 232 engages the opening 134 (FIG. 1) in the tile 10 while the contacts 110 of the edge connector 100 are directly contacting the anode pads 22 and cathode pads 28. Accordingly, as the edge connector 100 is slid onto the first edge of the tile 10 and the contacts 110 become aligned with defined ones of the anode and cathode pads 22 and 28, the enlarged end 232 may at least partially engage the opening 134 to lock the edge connector 100 onto the tile 10.

With reference to FIGS. 11 and 14, a portion of the flexure lever 232 may extend out of a rear portion of the edge connector 200, and may be configured so that a user may actuate the rearward extending portion of the flexure lever 230 to facilitate/cause the enlarged end 232 to release from the opening 134 in the tile 10 (e.g., lift rearward extending portion of the flexure lever 230 to facilitate disconnect of the edge connector 200 from the tile 10).

With reference to FIGS. 11 and 15, the flexure lever 232 may extend through a central portion of the edge connector 200 body to separate the wires 102 and associated contacts 110 into two groups, such as two equal groups. For example, the flexure lever 232 may be located between a first group of the wires 102 and associated contacts 110 that connect to the anode pads 22 and a second group of the wires 102 and associated contacts 110 that connect to the cathode pads 28. Accordingly, greater spacing and thereby insulation may be obtained between opposite polarity conductive paths between the first group of anode pads 22 and the second group of cathode pads 28, which may help to prevent the formation of unintended current paths (e.g., shorts or partial shorts) between the anode and cathode conductive paths, which might otherwise occur due to humidity, ionic salt exposures, moisture, solvent accumulations, the invasion of biological matter onto the surface between the contacts 110, and the like.

Figure 16:
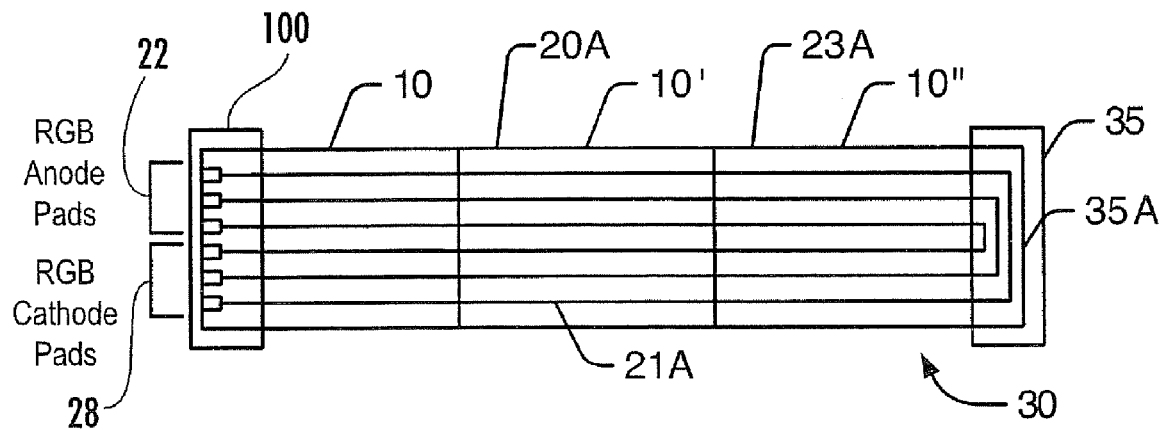
FIG. 16 is a schematic illustration of a bar assembly including an edge connector and a plurality of tiles in accordance with some embodiments of the present invention.

Multiple tiles 10 may be assembled to form a larger lighting bar assembly 30 as illustrated in FIG. 16. As shown therein, a bar assembly 30 may include two or more tiles 10, 10', 10" connected end-to-end via, for example, loop interconnects. Accordingly, referring to FIGS. 3 and 16, the cathode pads 24 of the first path 20 of the leftmost tile 10 may be electrically connected to the anode pads 22 of the first path 20 of the central tile 10', and the cathode pads 24 of the first path 20 of the central tile 10' may be electrically connected to the anode pads 22 of the first path 20 of the rightmost tile 10", respectively. Similarly, the anode pads 26 of the second path 21 of the leftmost tile 10 may be electrically connected to the cathode pads 28 of the second path 21 of the central tile 10', and the anode pads 26 of the second path 21 of the central tile 10' may be electrically connected to the cathode pads 28 of the second path 21 of the rightmost tile 10", respectively.

The anode and cathode pads 22 and 28 of the rightmost tile 10 may be connected to the edge connector 100, the edge connector 200, and/or another edge connector in accordance with some embodiments of the present invention.

Furthermore, the cathode pads 24 of the first path 20 of the rightmost tile 10" may be electrically connected to the anode pads 26 of the second path 21 of the rightmost tile 10" by a loopback connector 35. For example, the loopback connector 35 may electrically connect the cathode 24A of the string 20A of blue LED chips 16A of the first path 20 of the rightmost tile 10" with the anode 26A of the string 21A of blue LED chips of the second path 21 of the rightmost tile 10". In this manner, the string 20A of the first path 20 may be connected in serial with the string 21A of the second path 21 by a conductor 35A of the loopback connector 35 to form a single string 23A of blue LED chips 16. The other strings of the paths 20, 21 of the tiles 10, 10', 10" may be connected in a similar manner.

The loopback connector 35 may include an edge connector which may be configured, for example, as was described above and shown for the edge connector 100 or the edge connector 200. Alternatively, the loopback connector 35 may include a flexible wiring board, large wire interconnects (LWI), or any other suitable connector. In addition, the loop back connector 35 may include printed traces formed on/in the tile 10.

While the bar assembly 30 shown in FIG. 16 is a one dimensional array of tiles 10, other configurations are possible. For example, the tiles 10 could be connected in a two-dimensional array in which the tiles 10 are all located in the same plane, or in a three dimensional configuration in which the tiles 10 are not all arranged in the same plane. Furthermore the tiles 10 need not be rectangular or square, but could, for example, be hexagonal, triangular, or the like.

Figure 17:
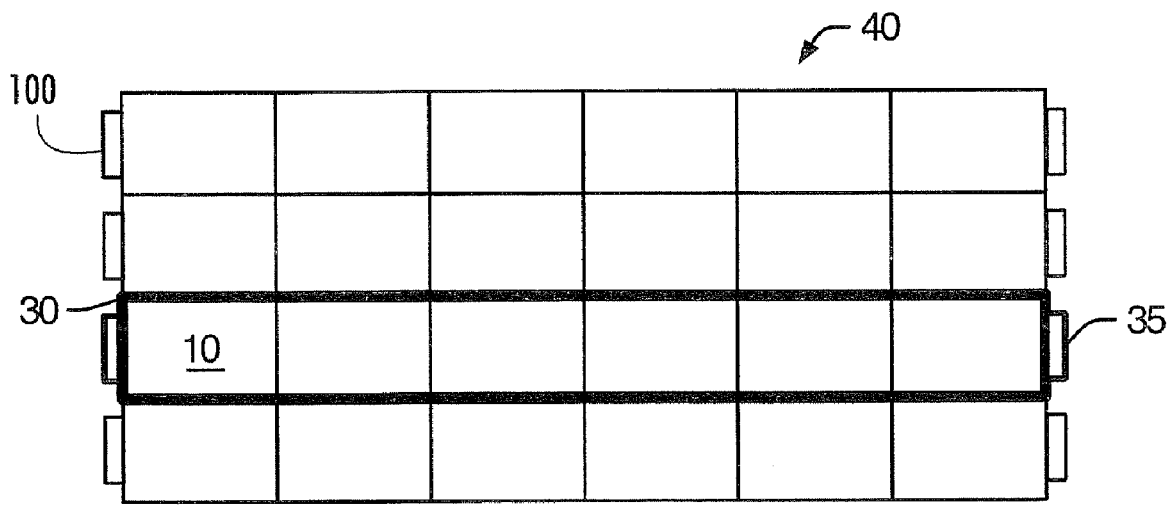
FIG. 17 is a schematic illustration of a lighting panel including a plurality of edge connectors and tiles in accordance with some embodiments of the present invention.

Referring to FIG. 17, in some embodiments, a plurality of bar assemblies 30 may be combined to form a lighting panel 40, which may be used, for example, as a backlighting unit (BLU) for an LCD display. As shown in FIG. 17, a lighting panel 40 may include four bar assemblies 30, each of which includes six tiles 10. The leftmost tile 10 of each bar assembly includes an edge connector (e.g., edge connector 100 or edge connector 200), and the rightmost tile 10" of each bar assembly 30 includes a loopback connector 35. Accordingly, each bar assembly 30 may include three strings 23 of LED chips (i.e. one red, one green and one blue).

In some embodiments, a bar assembly 30 may include four LED strings 23 (one red, two green and one blue). Thus, a lighting panel 40 including nine bar assemblies may have 36 separate strings of LED chips. Moreover, in a bar assembly 30 including six tiles 10 with eight solid state lighting elements 12 each, an LED string 23 may include 48 LED chips that are serially connected.

Figure 18:
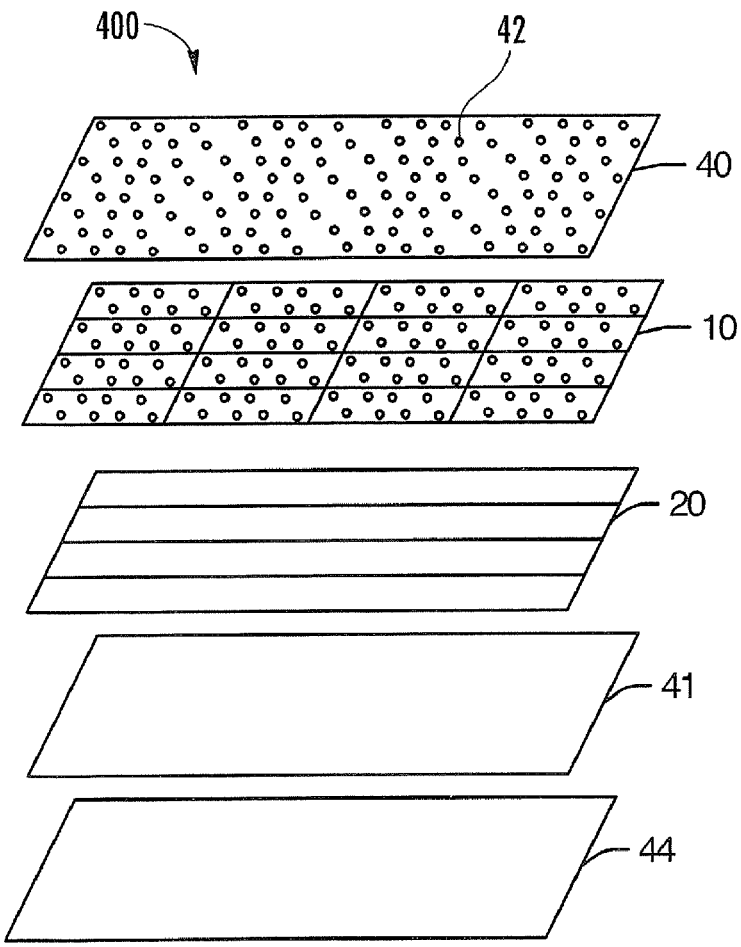
FIG. 18 is an exploded perspective view of a lighting assembly which includes a plurality of tiles arranged in a two dimensional array according to some embodiments of the invention.

FIG. 18 shows an exploded perspective view of a lighting assembly 400 which may include a plurality of tiles 10 having light sources 14 thereon arranged in a two dimensional array according to some embodiments of the invention. The tiles 10 are mounted on corresponding bars 20, which may be mounted for support on a cover bottom 44, which may include a metal plate. It will be appreciated that, in some embodiments, the tiles 10 may be mounted directly on the cover bottom 44. A reflector panel 40 including a plurality of apertures 42 therethrough is mounted above the tiles 10 such that the apertures 42 may align with respective light sources 12 on the tiles 10.

An optional thermal spacer, such as a graphite thermal spacer 41, may be provided between the cover bottom 44 and the bars 20. The thermal spacer 41 may include, for example, an anisotropic carbon spreader such as the Spreadershield available from Graphtec International, Ltd., of Cleveland, Ohio. The thermal spacer 41 may help disperse residual thermal nonuniformities in the system. The thermal spacer 41 may be held in place by compression force between the cover bottom 44 and the bars 20. Alternatively or additionally, the thermal spacer 41 may be pre-installed in the cover bottom 44 held in place using, for example, a two-sided pressure sensitive adhesive tape until final assembly.

The reflector panel 40 may be may have a length and width similar to the length and width of the two-dimensional array of tiles 12, or the reflector panel 40 may be formed from an array of smaller reflector panels each having a length and width similar to that of individual ones of the tiles 10. The reflector panel 40 is formed from and/or is covered by a material having a high light reflectivity, such as a bright white plastic foam material (e.g., bright white polyethylene-terephthalate (PET) plastic). The reflector panel 40 may be used to provide and/or improve recycling of light between the reflector panel 40 and another panel thereon, such as an LCD display panel. In addition to reflecting incident light, the reflector panel 40 may help disperse the light so that it is reflected in a random direction, which may improve the uniformity of light transmitted through an LCD display 100 or other panel thereon.

Figure 19A:
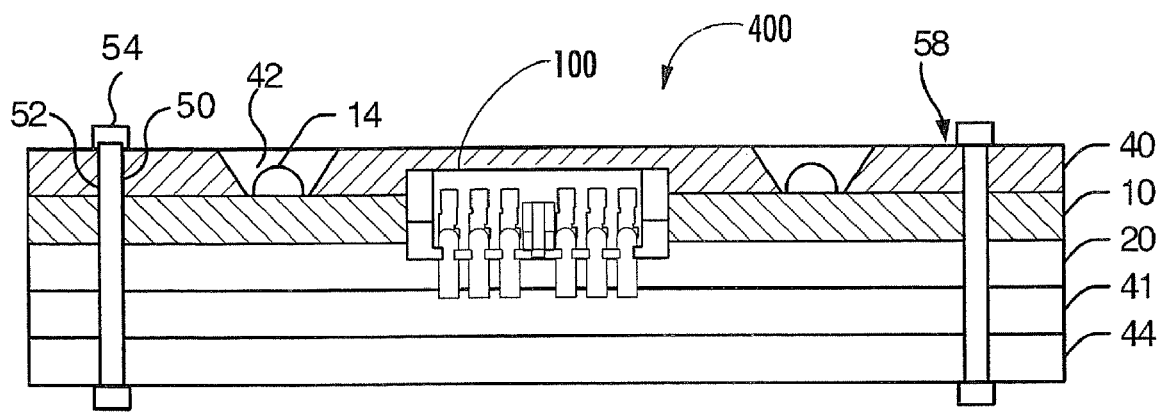
FIGS. 19A-B are cross sectional views of the lighting assembly of FIG. 18 according to some embodiments of the invention.

FIG. 19A is a cross sectional view of the lighting assembly 400 shown in FIG. 18. Referring to FIG. 19A, the tiles 10 may be affixed to respective bars 20 by means of an adhesive. The entire assembly 400 may be fastened together by means of fasteners 50. A fastener 50 may include at least a fastener body 52 which may extend through the reflector panel 40, a tile 10, a bar 20, and the optional thermal spacer 41, then into the cover bottom 44. The fastener 50 may include heads 54, which are configured to engage and hold the reflector panel 40 onto the cover bottom 44.

As shown in FIG. 19A, a height of the edge connector 100 above the tile 10 may be the same as or less than a height of an outer major surface of the reflector panel 40 above the tile 10. Accordingly, the edge connector 100 may be sufficient thin so that it does not increase the thickness of the lighting assembly 400.

Figure 19B:
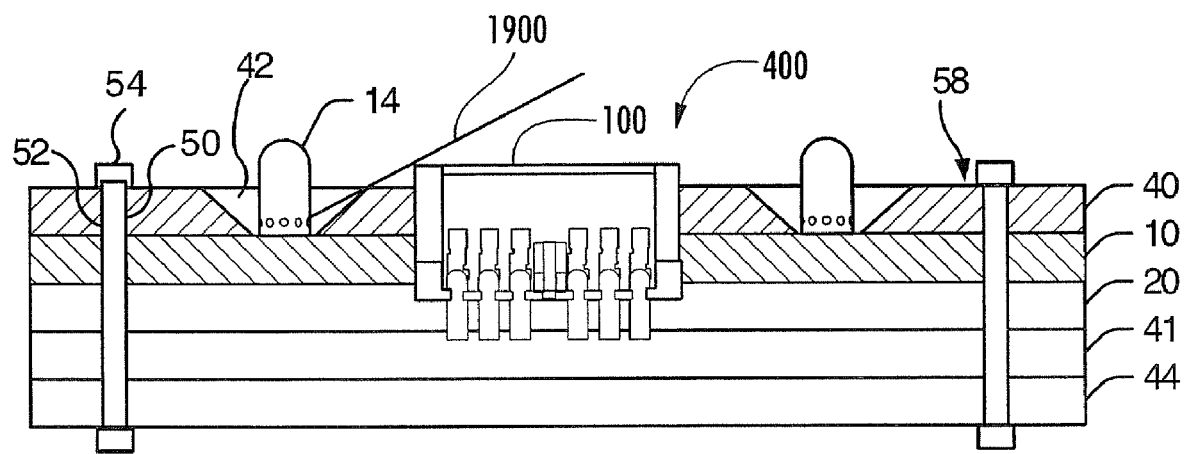

FIG. 19B is a cross sectional view of the lighting assembly 400 shown in FIG. 18 according to some other embodiments of the present invention. The thickness of the edge connector 100 is greater than the connector 100 shown in FIG. 19A. In particular, it is noted that the edge connector 100 shown in FIG. 19B has an upper surface that is raised above an upper surface of the reflector panel 40.

As was described above, each of the light sources 14 can include a plurality of spaced apart LED chips, and the LED chips may each generate different primary wavelength (color) of light. Because the edge connector 100 can be closer to one of the LED chips than to other ones of LED chips in a light source 14, the edge connector 100 may asymmetrically block more light of one color from the closest LED chip then other color light from the further away LED chips. This potential asymmetric blocking effect by the edge connector 100 is referred to as near-field color shadowing.

The amount of near-field color shadowing caused by the edge connector 100 can depend upon the spacing between the edge connector 100 and the LED chips in the light sources 14, and can depend upon the height of the upper surface of the edge connector 100 relative to the LED chips in the light sources 14.

An exemplary light ray 1900, generated by the LEDs in the light source 14, that just passes by a corner of the upper surface of the edge connector 100 has been illustrated in FIG. 19B, and is referred to herein as a tangential light ray. In some embodiments, the minimum distance between the edge connector 100 and the light sources 14 and/or the height of the edge connector 100 are defined so that the tangential light ray 1900 has a maximum angle of 30 degrees relative to horizontal, or more preferably so that the tangential light ray 1900 has a maximum angle of 15 degrees relative to horizontal, or even more preferably so that the tangential light ray 1900 has a maximum angle of 7 degrees relative to horizontal. As will be appreciated in view of the discussion herein, configuring the spacing and height of the edge connector 100 to provide a maximum angle of 7 degrees for the tangential light ray 1900 may provide less near-field color shadowing than a configuration that provides a maximum angle of 30 degrees for the tangential light ray 1900.

Accordingly, the minimum distance between the edge connector 100 and the light sources 14 may be increased to allow use of a thicker edge connector 100, and/or the thickness of the edge connector 100 may be reduced to allow a smaller minimum distance between the edge connector 100 and the light sources 14.

Figure 19C:
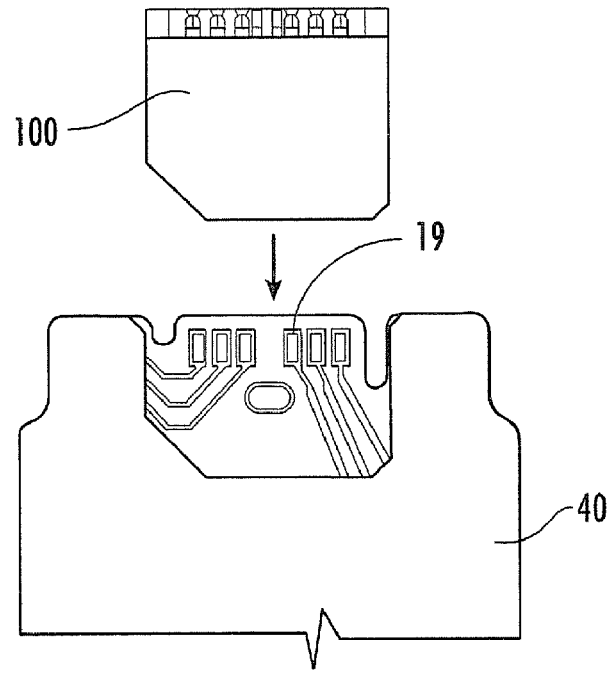
FIG. 19C is a top view of a portion of the lighting assembly of FIG. 18 according to some embodiments of the invention.

FIG. 19C is a top view of the edge connector 100 and the lighting assembly 400 of FIG. 19A. As illustrated in FIG. 19C, the reflector panel 40 can include a cut out that exposes the contacts 19 on the tile 10 (FIG. 1). Accordingly, the contacts of the edge connector 100 can electrically connect to the contacts 19 of the tile 10.

Figure 20:
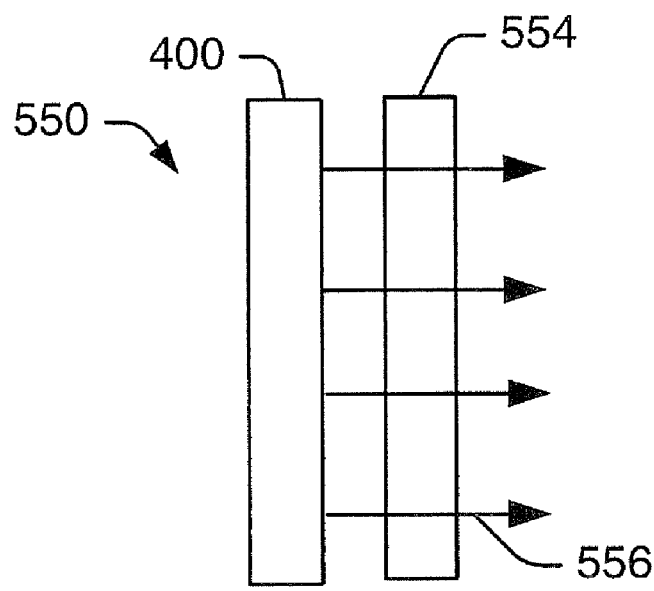
FIG. 20 is a schematic illustration of a lighting assembly including one or more tiles and edge connectors and configured as a backlight for an LCD display according to some embodiments of the invention.

Referring to FIG. 20, the lighting assembly 400 according to some embodiments of the invention may be used as a backlight for-a display such as a liquid crystal display (LCD) 550. As shown in FIG. 20, an LCD 550 may include the lighting assembly 400 that is positioned relative to an LCD screen 554 such that light 556 emitted by the lighting assembly 400 passes through the LCD screen 554, and thereby provide backlight for the LCD screen 554. The LCD screen 554 includes appropriately arranged shutters and associated filters that are configured to selectively pass/block a selected color of light 556 from the lighting panel 540 to generate a display image.

Figure 21:
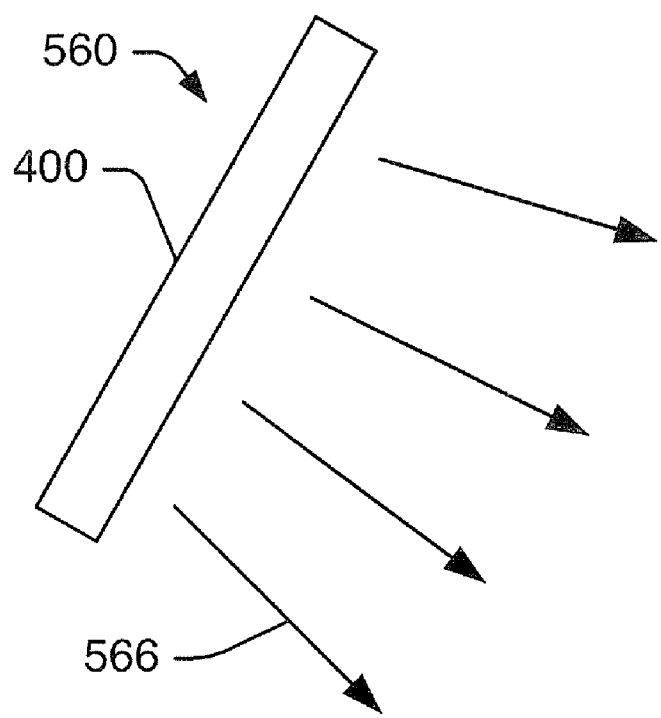
FIG. 21 is a schematic illustration of a lighting assembly including one or more tiles and edge connectors and configured as a lighting panel for a solid state lighting fixture or luminaire according to some embodiments of the invention.

Referring to FIG. 21, a lighting assembly 400 according to some embodiments of the invention may be used as a lighting panel for a solid state lighting fixture or luminaire 560. Light 566 emitted by the luminaire 560 may be used to illuminate an area and/or an object. Solid state luminaires are described, for example, in U.S. patent application Ser. No. 11/408,648, which is assigned to the assignee of the present invention and the disclosure of which is incorporated herein by reference in its entirety.

In the drawings and specification, there have been disclosed embodiments of the invention and, although specific terms are employed, they are used in a generic and descriptive sense only and not for purposes of limitation, the scope of the invention being set forth in the following claims.

What is claimed is:

1. An LED light unit comprising:
   a tile;
   a plurality of discrete LED light sources that are on and dispersed across a major surface of the tile and are electrically connected to electrical pads along an edge region of the tile; and an edge connector comprising a plurality of contacts that are connected to a plurality of flexible wires extending away from the edge connector, the edge connector is configured to releasably connect to an edge of the tile so that the contacts directly connect to the pads and electrically connect the wires of the edge connector to the LED light sources, wherein the edge connector comprises a body with a plurality of recessed channels defined therein, each of the recessed channels being configured to guide a portion of one of the flexible wires away from the tile, wherein each one of the LED light sources comprises at least first and second LED chips, the first and second LED chips of the LED light sources are respective electrically connected to first and second tile pads, and the edge connector is configured to respective electrically connect first and second pairs of the plurality of wires to the first and second LED chips via the first and second tile pads.

2. The LED light unit of claim 1, wherein each of the recessed channels is configured to releasably connect to a portion of one of the flexible wires and to guide the connected portion of the flexible wire at a non-zero angle away from a plane of the major surface of the tile.

3. The LED light unit of claim 2, wherein each of the recessed channels is configured to guide the connected portion of the flexible wire at about a 90° angle away from the plane of the major surface of the tile.

4. The LED light unit of claim 1, wherein:
each one of the LED light sources comprises an encapsulant that encloses the LED chips; and
a height of the edge connector above the major surface of the tile is no more than a height of the encapsulants of the LED light sources above the major surface of the tile.

5. An LED light unit comprising:
a tile;
a plurality of discrete LED light sources that are on and dispersed across a major surface of the tile and are electrically connected to electrical pads along an edge region of the tile; and
an edge connector comprising a plurality of contacts that are connected to a plurality of wires extending away from the edge connector, the edge connector configured to releasably connect to an edge of the tile so that the contacts directly connect to the pads and electrically connect the wires of the edge connector to the LED light sources, wherein the edge connector comprises a body with a cavity having an inner surface, and a locking mechanism that comprises a flexure lever that extends into the cavity and releasably locks onto an opening in a major surface of the tile while the edge connector contacts are directly connected to the tile pads and electrically connect the wires of the edge connector to the LED light sources.

6. The LED light unit of claim 5, further comprising a reflector panel comprising a material with high light reflectivity and defining apertures therein, and wherein:
the reflector panel extends across the major surface of the tile and the apertures are aligned with the plurality of LED light sources; and
a height of the edge connector above the major surface of the tile is no more than a height of an outer major surface of the reflector panel above the major surface of the tile.

7. The LED light unit of claim 6, wherein the body is configured to hold the wires along a plane, and the flexure lever extends through at least a portion of the body and separates the wires along the plane into two groups.

8. The LED light unit of claim 7, wherein the flexure lever extends through at least a portion of the body to separate the wires along the plane into two equal groups.

9. The LED light unit of claim 8, wherein the edge connector is configured to align and connect the first group of the wires to tile pads which are connected to anode terminals and not cathode terminals of the LED light sources, and configured to align and connect the second group of the wires to tile pads which are connected to cathode terminals and not anode terminals of the LED light sources.

10. The LED light of claim 6, wherein the edge connector comprises a material with high diffuse light reflectivity.

11. The LED light of claim 10, wherein the edge connector comprises a bright white material.

12. The LED light unit of claim 6, wherein the edge connector is configured to align and directly connect a different one of the edge connector contacts to a different one of the tile pads when the edge connector is connected to the tile.

13. The LED light unit of claim 12, wherein:
each one of the LED light sources comprises a red LED chip connected to a first pair of the tile pads, a green LED chip connected to a second pair of the tile pads, and a blue LED chip connected to a third pair of the tile pads; and
the edge connector is configured to electrically connect a first pair of the wires to the red LED chip via the first pair of tile pads, to electrically connect a second pair of the wires to the green LED chip via the second pair of tile pads, and to electrically connect a third pair of the wires to the blue LED chip via the third pair of tile pads.

14. The LED light unit of claim 6, wherein the plurality of connector wires are separate from one another along a major portion of their length and are independently flexible relative to one another.

15. The LED light unit of claim 6, wherein the plurality of connector wires comprise a ribbon cable.

16. An LED light unit comprising:
a tile;
a plurality of discrete LED light sources that are on and dispersed across a major surface of the tile and are electrically connected to electrical pads along an edge region of the tile; and
an edge connector comprising a plurality of contacts that are connected to a plurality of flexible wires extending away from the edge connector, the edge connector configured to releasably connect to an edge of the tile so that the contacts directly connect to the pads and electrically connect the wires of the edge connector to the LED light sources, and the edge connector comprises a body having a notched corner adjacent to a closest one of the LED light sources.

17. The LED light unit of claim 16, wherein:
the LED light sources are arranged on the tile in a staggered grid extending in a direction away from the connected edge connector.

18. The LED light unit of claim 6, wherein:
each one of the LED light sources comprises at least one LED chip within an encapsulant; and
a height of the edge connector above the at least one LED chip and a closest distance from the upper surface of the edge connector to the at least one LED chip are configured so that a tangential light ray angle between the at least one LED chip to a closest upper surface of the edge connector is no more than 30 degrees relative to horizontal.

19. The LED light unit of claim 18, wherein:
each one of the LED light sources comprises at least one LED chip within an encapsulant; and
a height of the edge connector above the at least one LED chip and a closest distance from the upper surface of the edge connector to the at least one LED chip are configured so that a tangential light ray angle between the at least one LED chip to a closest upper surface of the edge connector is no more than 7 degrees relative to horizontal.

20. The LED light unit of claim 6, wherein:
the tile comprises at least one notch along a edge portion thereof; and
the edge connector further comprises at least one elongated member extending from the body along at least a portion of the cavity, the elongated member located in the cavity to slide into the notch in the tile and guide the edge connector to align the edge connector contacts with the tile pads when an upper surface of the edge connector is facing upward relative to an upper surface of the tile, and to prevent connection of the edge connector to the tile when a lower surface of the edge connector is facing upward relative to an upper surface of the tile.

21. An LED lighting assembly comprising:
a plurality of discrete tiles, each of the tiles comprising a plurality of discrete LED light sources that are on and dispersed across a major surface of the tile and are electrically connected to electrical pads along an edge region of the tile;
a plurality of bars, wherein a plurality of the tiles are mounted to, and mechanical supported by, each of the bars to form a plurality of bar-tile assemblies arranged in a planar array; and
a plurality of edge connectors, wherein each of the edge connectors comprises a plurality of contacts that are connected to a plurality of flexible wires extending away from the edge connector, the edge connector configured to releasably connect to an edge of an end tile along one of the bars so that the contacts directly connect to the pads of the connected end tile and electrically connect the wires of the edge connector to the LED light sources on the connected bar, and each of the edge connectors comprises a body with a cavity having an inner surface, and a locking mechanism that comprises a flexure lever that extends into the cavity and releasably locks onto an opening in a major surface of the tile while the edge connector contacts are directly connected to the tile pads and electrically connect the wires of the edge connector to the LED light sources.

22. The LED light assembly of claim 21, wherein the pads of the end tile on the connected bar are electrically connected to a circuit path that extends through a plurality of the LED light sources on each of the tiles attached to the same connected bar.

23. The LED lighting assembly of claim 21, further comprising an LCD panel on the plurality of bars and arranged so that light from the LED light sources can pass therethrough.

24. A solid state lighting assembly, comprising:
a substrate including a major surface, an edge adjacent the major surface, and a plurality of electrical traces on the major surface;
a plurality of electrical contact pads on the major surface of the substrate and disposed adjacent the edge of the substrate, each of the plurality of electrical contact pads being connected to a respective one of the plurality of electrical traces;
a plurality of solid state light emitting devices on the major surface of the substrate, wherein the plurality of solid state light emitting devices are in electrical communication with at least one of the plurality of contact pads through at least one of the plurality of electrical traces; and
an edge connector on the edge of the substrate including at least two electrical contacts in contact with at least two of the electrical contact pads, the edge connector comprises a plurality of flexible wires extending away from the edge connector, and wherein the edge connector is configured to releasably connect to the edge of the substrate so that the electrical contacts directly connect to the contact pads and electrically connect the wires of the edge connector to the solid state light sources, and wherein the edge connector comprises a body with a cavity having an inner surface, and a locking mechanism that comprises a flexure lever that extends into the cavity and releasably locks onto an opening in a major surface of the substrate while the edge connector contacts are directly connected to the contact pads and electrically connect the wires of the edge connector to the solid state light emitting devices.

25. The solid state lighting assembly of claim 24, wherein a plurality of recessed channels are defined in the body of the edge connector, each of the recessed channels is configured to connect to and guide a portion of one of the flexible wires at a non-zero angle away from a plane of the major surface of the substrate.

26. The solid state lighting assembly of claim 25, wherein each of the recessed channels is configured to guide the connected portion of the flexible wire at about a 90° angle away from the plane of the major surface of the tile.

27. The solid state lighting assembly of claim 24, wherein:
each one of the solid state light emitting devices comprises at least one LED chip within an encapsulant; and
a height of the edge connector above the major surface of the substrate is no more than a height of the encapsulants of the solid state light emitting devices above the major surface of the substrate.

* * * * *

UNITED STATES PATENT AND TRADEMARK OFFICE
CERTIFICATE OF CORRECTION

PATENT NO. : 7,621,655 B2  Page 1 of 1
APPLICATION NO. : 11/600642
DATED : November 24, 2009
INVENTOR(S) : Roberts et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 181 days.

Signed and Sealed this

Twenty-sixth Day of October, 2010

David J. Kappos
*Director of the United States Patent and Trademark Office*